(12) United States Patent
Kubo et al.

(10) Patent No.: US 10,843,555 B2
(45) Date of Patent: Nov. 24, 2020

(54) OPENING/CLOSING DEVICE OF FUEL TANK

(71) Applicant: TOYODA GOSEI CO., LTD., Kiyosu (JP)

(72) Inventors: Tomohiro Kubo, Kiyosu (JP);
Norihiko Ishihara, Kiyosu (JP);
Tetsuya Shibazaki, Tokyo (JP);
Takashi Sakamoto, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/567,225

(22) Filed: Sep. 11, 2019

(65) Prior Publication Data

US 2020/0101838 A1    Apr. 2, 2020

(30) Foreign Application Priority Data

Sep. 28, 2018    (JP) ................................. 2018-183218
Sep. 28, 2018    (JP) ................................. 2018-183219
Sep. 28, 2018    (JP) ................................. 2018-183221
Feb. 12, 2019    (JP) ................................. 2019-022208

(51) Int. Cl.
*B60K 15/04* (2006.01)

(52) U.S. Cl.
CPC ...... *B60K 15/04* (2013.01); *B60K 2015/0461* (2013.01)

(58) Field of Classification Search
CPC ............ B60K 15/04; B60K 2015/0429; B60K 2015/0461

USPC ......................................... 141/350; 220/86.2
See application file for complete search history.

(56) References Cited

U.S. PATENT DOCUMENTS

| | | | |
|---|---|---|---|
| 8,087,434 B2 * | 1/2012 | Stephan ................. | B60K 15/04 141/350 |
| 10,226,996 B2 * | 3/2019 | Giles ...................... | B60K 15/04 |
| 10,406,913 B2 * | 9/2019 | Miura .................... | B60K 15/04 |
| 10,633,242 B2 * | 4/2020 | Wakao ..................... | B67D 7/54 |
| 10,737,571 B2 * | 8/2020 | Kim .................... | B60K 15/0406 |
| 2017/0182880 A1 | 6/2017 | Hagano et al. | |
| 2018/0170174 A1 * | 6/2018 | Wakao .................. | B60K 15/04 |
| 2018/0370353 A1 * | 12/2018 | Ogose .................... | B60K 15/04 |

FOREIGN PATENT DOCUMENTS

JP        2017-114272 A        6/2017

* cited by examiner

*Primary Examiner* — Timothy L Maust
(74) *Attorney, Agent, or Firm* — Posz Law Group, PLC

(57) ABSTRACT

In a housing surrounding a nozzle insertion passage, a first opening open to the atmosphere is provided, and in a cover main body in which the housing is incorporated, a nozzle insertion port and a second opening which is opposite the first opening and open to the atmosphere is provided. Moreover, in the recess wall of a drainage port formation member fitted to the first opening, a recess which is recessed on the side of the first opening is formed so as to be continuous with the second opening, and a drainage port is provided. A drainage valve is held in the recess with respect to the recess wall so as to open and close the drainage port by turning of the valve main body about the turning shaft serving as a base point.

18 Claims, 10 Drawing Sheets

OPENING/CLOSING DEVICE OF FUEL TANK

CROSS REFERENCE TO RELATED APPLICATIONS

This application claims priority based on Japanese Patent Application No. 2018-183218 filed on Sep. 28, 2018, Japanese Patent Application No. 2018-183219 filed on Sep. 28, 2018, Japanese Patent Application No. 2018-183221 filed on Sep. 28, 2018, and Japanese Patent Application No. 2019-22208 filed on Feb. 12, 2019, the entire content of which is hereby incorporated by reference.

BACKGROUND

Field

The present disclosure relates to an opening/closing device of a fuel tank.

Related Art

As disclosed in JP2017-114272A, a conventional opening/closing device of a fuel tank includes an opening/closing valve in a drainage path which makes a fuel passage communicate with the outside of the device. In JP2017-114272A, the drainage path is normally closed with the opening/closing valve, and thus the entrance of dust and the like from the outside is prevented. When a liquid such as rain water enters the fuel passage, the liquid which enters it is discharged to the outside by opening the interior of the opening/closing device with the opening/closing valve.

In the opening/closing device of the fuel tank disclosed in patent literature 1, the part where the drainage path is formed is protruded from an outer body to the outside. A protruded part that includes the part where the drainage path is formed is exposed in a refueling chamber to which the opening/closing device is fitted. Since there is a restriction on the installation space of the opening/closing device in the refueling chamber of a vehicle, and there is a restriction on appearance design in which the opening/closing device is visually recognized by a user each time refueling is performed, it may be preferable to prevent the part where the drainage path is formed from being significantly protruded from the outer body. On the other hand, when the protrusion of the part where the drainage path is formed is reduced, the drainage performance of the drainage path may be lowered. Hence, it is required to reduce the amount of protrusion of the part protruded from the outer body while acquiring the drainage performance of the drainage path.

SUMMARY

The present disclosure may be realized as the following aspects.

According to an aspect of an opening/closing device of a fuel tank, an opening/closing device of a fuel tank is provided. The opening/closing device of the fuel tank includes: a housing that includes: a passage circumferential wall which surrounds a nozzle insertion passage for a refueling nozzle; and a first opening which is formed in the passage circumferential wall and through which the nozzle insertion passage is open to the atmosphere; a cover main body in which the housing is incorporated and which includes: a circumferential wall that surrounds the housing; a second opening that is formed in the circumferential wall, that is opposite the first opening and that is open to the atmosphere; and a nozzle insertion port for the refueling nozzle that is formed in a ceiling wall of the circumferential wall; an insertion port opening/closing mechanism which opens and closes the nozzle insertion port; and a drainage mechanism which is fitted to the housing so as to be continuous with the first opening and which is located between the cover main body and the housing, the drainage mechanism includes: a drainage port formation member which includes a drainage port for a liquid that flows from the nozzle insertion passage toward the first opening and which is fitted to the first opening such that the liquid reaches the drainage port; and a holding member which is fitted to the housing so as to hold a state where the drainage port formation member is fitted to the first opening and which holds a drainage valve for opening and closing the drainage port to the drainage port formation member and the holding member includes: a third opening which is continuous with the second opening, a drainage passage which is formed between the third opening and the drainage port; and an engaged portion which engages with an engagement portion that is provided on the passage circumferential wall around the first opening in the housing.

According to another aspect of an opening/closing device of a fuel tank, an opening/closing device of a fuel tank is provided. The opening/closing device of the fuel tank includes: a housing that includes: a passage circumferential wall which surrounds a nozzle insertion passage for a refueling nozzle; and a first opening which is formed in the passage circumferential wall and through which the nozzle insertion passage is open to the atmosphere; a cover main body in which the housing is incorporated and which includes: a circumferential wall that surrounds the housing; a second opening that is formed in the circumferential wall, that is opposite the first opening and that is open to the atmosphere; and a nozzle insertion port for the refueling nozzle that is formed in a ceiling wall of the circumferential wall; an insertion port opening/closing mechanism which opens and closes the nozzle insertion port; and a drainage mechanism which is fitted to the housing so as to be continuous with the first opening and which is located between the cover main body and the housing, the drainage mechanism includes: a drainage passage which is extended from the first opening to the second opening and which is provided with a drainage port so as to make the drainage port for a liquid flowing from the nozzle insertion passage toward the first opening continuous with the first opening; and a drainage valve which includes a turning shaft and a valve main body and which opens and closes the drainage port by turning of the valve main body about the turning shaft, the turning shaft is arranged in the drainage passage so as to be located on the side of a center axis of the nozzle insertion passage with respect to the valve main body, the length of the valve main body in a direction parallel to the turning shaft is longer than the length thereof in a direction perpendicular to the turning shaft in front view and the drainage port is an opening which has such a shape that the opening is able to be opened and closed with the valve main body.

According to yet another aspect of an opening/closing device of a fuel tank, an opening/closing device of a fuel tank is provided. The opening/closing device of the fuel tank includes: a housing that includes: a passage circumferential wall which surrounds a nozzle insertion passage for a refueling nozzle; and a first opening which is formed in the passage circumferential wall and through which the nozzle insertion passage is open to the atmosphere; a cover main body in which the housing is incorporated and which includes: a circumferential wall that surrounds the housing; a second opening that is formed in the circumferential wall, that is opposite the first opening and that is open to the atmosphere; and a nozzle insertion port for the refueling nozzle that is formed in a ceiling wall of the circumferential wall; an insertion port opening/closing mechanism which opens and closes the nozzle insertion port; and a drainage mechanism which is located between the cover main body and the housing so as to drain a liquid from the nozzle insertion passage, the drainage mechanism includes: a drainage port formation member which includes a recess wall that is fitted to the first opening, that is protruded from the first opening toward a center axis of the nozzle insertion port and that forms a recess recessed on the side of the first opening so as to make the recess continuous with the second opening and in which in the recess wall, a drainage port for the liquid flowing from the nozzle insertion passage toward the first opening is formed; a drainage valve which includes a turning shaft and a valve main body and which opens and closes the drainage port by turning of the valve main body about the turning shaft serving as a base point; and a holding member which includes a holding piece that holds the turning shaft with respect to the recess wall.

The present disclosure may be realized in various aspects. For example, the present disclosure may be realized in an aspect of a fuel tank which includes an opening/closing device of the fuel tank, in an aspect of a filler neck which includes an opening/closing device of a fuel tank and in an aspect of a method of manufacturing an opening/closing device of a fuel tank.

DETAILED DESCRIPTION

Figure 1:
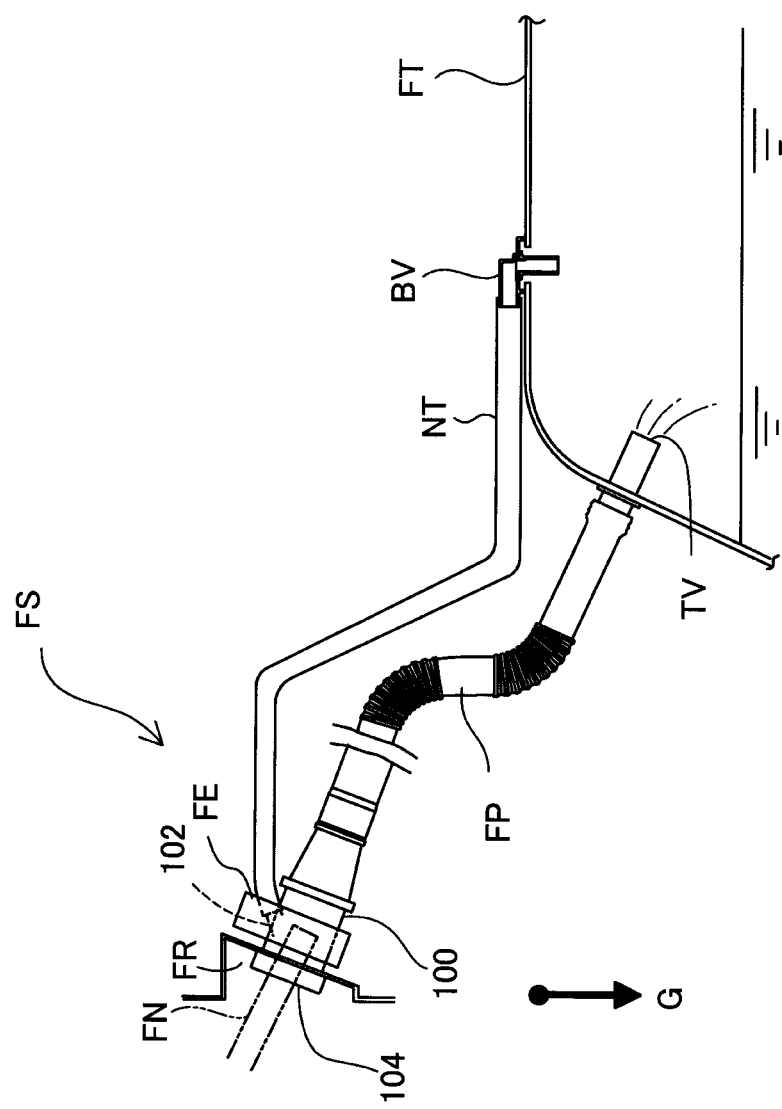
FIG. 1 is an illustrative view showing an outline of a refueling device which includes an opening/closing device of a fuel tank according to an embodiment of the present disclosure.

FIG. 1 is an illustrative view showing an outline of a refueling device FS which includes an opening/closing device 20 of a fuel tank according to an embodiment of the present disclosure. The refueling device FS is fitted to a vehicle so as to guide a fuel supplied from a refueling nozzle FN to the fuel tank FT. In FIG. 1 and individual drawings subsequent to FIG. 1, an arrow G which indicates a vertical direction is drawn. The refueling device FS includes a filler neck 100, a fuel vapor port 102, a filler pipe FP, a check valve TV, a fuel vapor tube NT, a gas discharge valve BV and a fitting member FE. The filler neck 100 is fitted to a refueling chamber FR with the fitting member FE so as to receive the insertion of the refueling nozzle FN into a nozzle insertion port 104. Instead of the fitting member FE shown in the figure, by use of a disc-shaped board where a circular hole into which part of the filler neck 100 is inserted is formed in a center, the filler neck 100 may be fitted to the refueling chamber FR.

The filler neck 100 is connected to the fuel tank FT with the filler pipe FP and the fuel vapor tube NT. The filler neck 100 guides a liquid fuel such as gasoline from the refueling nozzle FN (see FIG. 1) inserted into the nozzle insertion port 104 to the fuel tank FT connected through the filler pipe FP. The filler pipe FP is, for example, a tube made of resin which has bellows structures at two places, and is able to be expanded and contracted and curved within a certain range. The filler pipe FP is connected through the check valve TV to the fuel tank FT. The fuel discharged from the refueling nozzle FN inserted into the nozzle insertion port 104 is passed through a fuel passage which is formed with the filler neck 100 and which will be described later and the filler pipe FP, and is guided from the check valve TV to the fuel tank FT. The check valve TV prevents the backflow of the fuel from the fuel tank FT to the filler pipe FP.

One end of the fuel vapor tube NT is connected through the gas discharge valve BV to the fuel tank FT, and the other end is connected to the fuel vapor port 102 which is protruded from the filler neck 100. The gas discharge valve BV functions as a joint which connects the fuel vapor tube NT to the fuel tank FT. Air containing fuel vapor within the tank flows from the gas discharge valve BV into the fuel vapor tube NT. At the time of refueling from the refueling nozzle FN, the fuel vapor is guided together with the supplied fuel to the fuel tank FT through the filler pipe FP. In the following discussion, the filler neck 100 will be described in detail.

Figure 2:
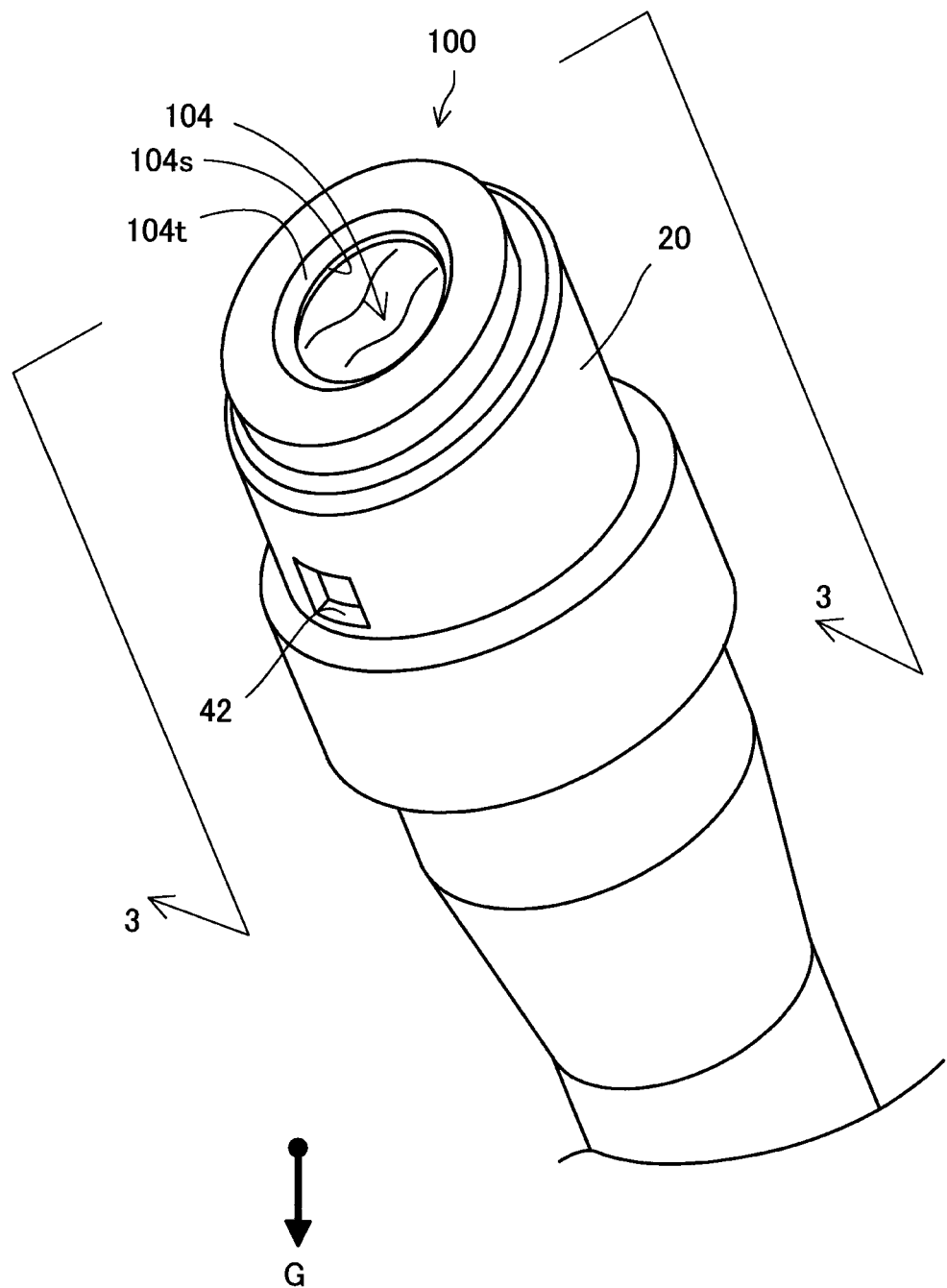
FIG. 2 is a perspective view schematically showing a filler neck in which the opening/closing device of the fuel tank according to the embodiment is incorporated.
Figure 3:
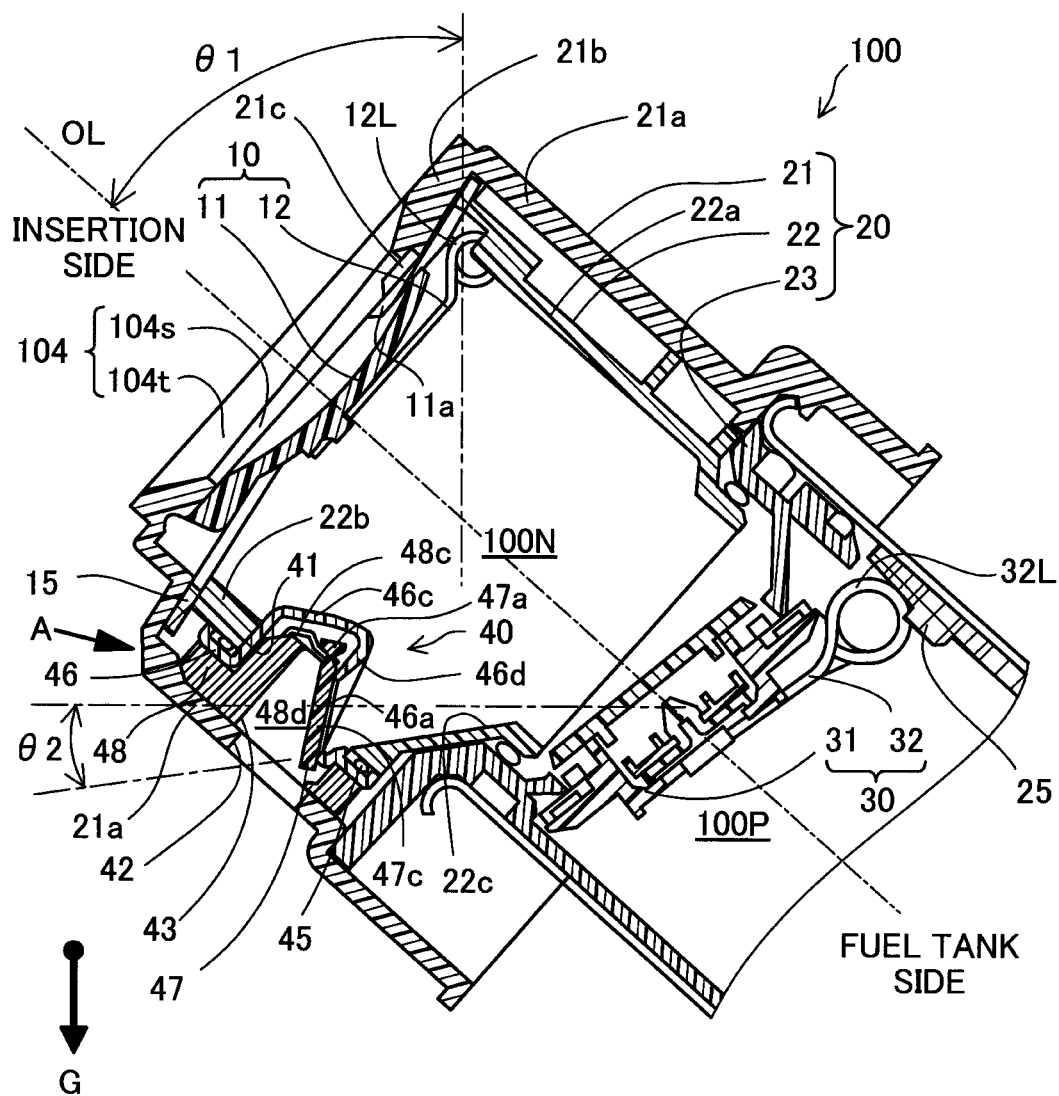
FIG. 3 is an illustrative view showing a cross section of main parts of the filler neck taken along line 3-3 of FIG. 2.
Figure 4:
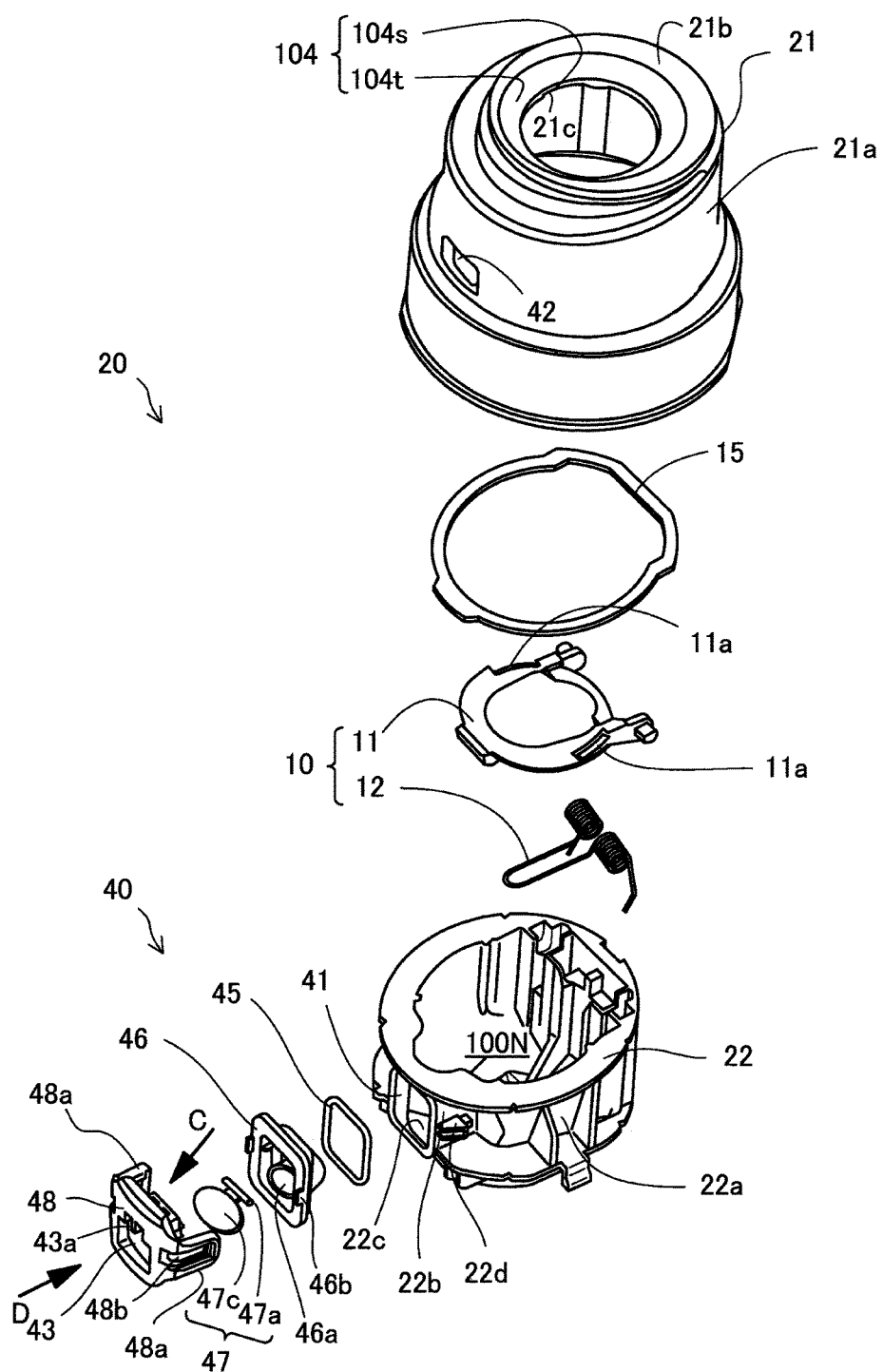
FIG. 4 is an exploded perspective view of the opening/closing device of the fuel tank.

FIG. 2 is a perspective view schematically showing the filler neck 100 in which the opening/closing device 20 of the fuel tank according to the embodiment is incorporated. FIG. 3 is an illustrative view showing a cross section of main parts of the filler neck 100 taken along line 3-3 of FIG. 2. FIG. 4 is an exploded perspective view of the opening/closing device 20 of the fuel tank. When in the following discussion, the position relationship of members is described, the side close to the fuel tank FT is referred to as the "fuel tank side" as necessary, and the side close to the nozzle insertion port 104 is referred to as the "insertion side" as necessary. In FIG. 3, for clear illustration of constituent members, as necessary, the end faces of internal constituent members are shown in cross section.

As shown in FIGS. 3 and 4, the filler neck 100 includes an insertion port opening/closing mechanism 10, the opening/closing device 20, a tank-side opening/closing mechanism 30 and a drainage mechanism 40. The opening/closing device 20 includes: an outer body 21 that includes the nozzle insertion port 104 into which the refueling nozzle FN (see FIG. 1) is inserted; an inner body 22 that includes a nozzle insertion passage 100N for the refueling nozzle FN; an under body 23 that assembles the tank-side opening/closing mechanism 30 to the inner body 22 on the fuel tank side; and a fuel passage formation portion 25 that forms a fuel passage 100P which guides, to the fuel tank FT, the liquid fuel supplied from the refueling nozzle FN. The individual bodies are formed substantially cylindrically.

The outer body 21 is a cover main body into which the inner body 22 is assembled, and includes, in a circumferential wall 21a surrounding the inner body 22, a second opening 42 which is open to the atmosphere. The second opening 42 is opposite a first opening 41 which will be described later and which is included in the inner body 22. The outer body 21 includes, in the ceiling wall 21b of the circumferential wall 21a, the nozzle insertion port 104 for the refueling nozzle FN. The nozzle insertion port 104 is formed such that a tapered nozzle insertion-side circumferential wall 104t is continuous with a refueling port circumferential wall 104s which is formed substantially in the shape of a circular hole. The outer body 21 is a resin molded article formed of an oil-resistant resin such as PA (polyamide).

The inner body 22 is a housing which includes the first opening 41 in a passage circumferential wall 22a that surrounds the nozzle insertion passage 100N, and the nozzle insertion passage 100N is open to the atmosphere through the first opening 41. As shown in FIGS. 3 and 4, in the inner body 22, a partial region of the passage circumferential wall 22a is formed as a protrusion wall portion 22b which is protruded outward along the radial direction of the nozzle insertion passage 100N. Furthermore, in the inner body 22, the first opening 41 formed in the protrusion wall portion 22b is continuous with the nozzle insertion passage 100N, and the passage circumferential wall 22a on the side of an open bottom portion of the first opening 41 is an inclined wall portion 22c. In the inner body 22, in order for the passage circumferential wall 22a to be reinforced, a plurality of ribs are provided between the upper and lower flanges of the body, and moreover, a protrusion piece for providing a holding force to the outer body 21 is provided in the lower flange. Since these members are not directly related to the main parts of the present disclosure, the description thereof will be omitted.

When the filler neck 100 is in a fitted posture in which the filler neck 100 is fitted to the vehicle, more specifically, when as shown in FIG. 3, the filler neck 100 is in an inclined posture in which the filler neck 100 is inclined with respect to the vertical direction at a predetermined inclination angle θ1 (30° to 50°), the inclined wall portion 22c is inclined such that one of both ends of the inclined wall portion 22c on the side of the first opening 41 is located lower vertically than at least the end on the side of the nozzle insertion passage 100N. The function of the inclined wall portion 22c will be described later. The inclined wall portion 22c is also referred to as a "liquid guide portion". The inner body 22 and the under body 23 which will be described later are resin molded articles formed of an oil-resistant resin such as PA (polyamide). The inclination angle θ1 is an inclination angle of a center axis OL of the nozzle insertion passage 100N or the fuel passage 100P with respect to the vertical direction.

The insertion port opening/closing mechanism 10 is arranged on the side of the ceiling wall 21b of the outer body 21 so as to open and close the nozzle insertion port 104. Specifically, the insertion port opening/closing mechanism 10 is moved to an insertion port open position so as to open the nozzle insertion port 104 as the refueling nozzle FN is inserted into the nozzle insertion port 104 whereas in a state where the refueling nozzle FN is not inserted, the insertion port opening/closing mechanism 10 closes the bottom portion of the opening of the nozzle insertion port 104 from the side of the nozzle insertion passage 100N.

The insertion port opening/closing mechanism 10 includes: an insertion port opening/closing member 11 for the opening/closing of the nozzle insertion port 104; an insertion-side spring 12 that is fixed to the inner body 22 and that biases the insertion port opening/closing member 11 in a direction in which the insertion port opening/closing member 11 is closed; and an annular member 15 that is fitted to the ceiling wall 21b of the outer body 21 so as to surround the insertion port opening/closing member 11. The annular member 15 is an article molded of a porous sponge rubber so as to reduce an impact applied to the ceiling wall 21b and to restrict the flow of the fuel vapor out to the atmosphere. The insertion port opening/closing member 11 is an article molded of a material whose hydrophobicity is higher than the outer body 21, for example, PPS (polyphenylene sulfide), and is formed in the shape of a disc whose center portion is recessed toward the nozzle insertion passage 100N. As shown in FIG. 4, the insertion port opening/closing member 11 includes a sunk recess 11a in its upper surface. The sunk recess 11a functions as a communication port which makes the nozzle insertion passage 100N communicate with the atmosphere in the circumferential wall of the nozzle insertion port 104.

The insertion-side spring 12 is fixed to the inner body 22 at a fixing end 12L and is fixed to the insertion port opening/closing member 11 at a free end on the side opposite to the fixing end 12L. The insertion-side spring 12 is turned about the fixing end 12L within the range of a predetermined angle so as to bias the insertion port opening/closing member 11 in a direction in which the fuel passage 100P is closed. Hence, when refueling is not performed, the insertion port opening/closing member 11 is pressed to an end face on the lower end side of the opening of the refueling port circumferential wall 104s in the nozzle insertion port 104 so as to close the nozzle insertion port 104. The insertion port opening/closing mechanism 10 may be a type of a pair of flap valves in which as the refueling nozzle FN is inserted, the nozzle insertion port 104 is opened and closed laterally or vertically when the insertion port is seen in front view.

In a relationship with the insertion port opening/closing member 11 of the insertion port opening/closing mechanism 10 described above, in the outer body 21, the end face on the lower end side of the refueling port circumferential wall 104s is the end face of seating of the insertion port opening/closing member 11. In the outer body 21, as shown in FIG. 4, a communication port 21c is provided in the end face on the lower end side of the refueling port circumferential wall 104s. The communication port 21c is formed by cutting out the end face on the lower end side of the refueling port circumferential wall 104s. In a state where the nozzle insertion port 104 is closed with the insertion port opening/closing member 11 of the insertion port opening/closing mechanism 10 which has already been described, the communication port 21c is overlaid on the sunk recess 11a of the insertion port opening/closing member 11, and thus together with the sunk recess 11a, the communication port 21c makes the nozzle insertion passage 100N communicate with the atmosphere in the circumferential wall of the nozzle insertion port 104. Any one of the sunk recess 11a and the communication port 21c may be formed or both of them may be formed in different positions so as to individually make the nozzle insertion passage 100N communicate with the atmosphere in the circumferential wall of the nozzle insertion port 104.

The fuel passage formation portion 25 is assembled to the lower end side of the outer body 21 so as to make the fuel passage 100P continuous with the nozzle insertion passage 100N of the inner body 22 with the intervention of the tank-side opening/closing mechanism 30 which will be described later.

As shown in FIG. 3, the tank-side opening/closing mechanism 30 is arranged in part in which the fuel passage 100P formed with the fuel passage formation portion 25 and the nozzle insertion passage 100N are continuous with each other, and thus the tank-side opening/closing mechanism 30 opens and closes the nozzle insertion passage 100N on the fuel tank side. A member to which the tank-side opening/closing mechanism 30 is assembled is the under body 23, and the under body 23 is fitted through a seal member to the outer body 21 and the inner body 22 in a liquid-tight and airtight manner. The tank-side opening/closing mechanism 30 includes: a tank-side opening/closing member 31 which is assembled through the fuel passage formation portion 25 to the under body 23 so as to open and close the nozzle insertion passage 100N; and a tank-side spring 32 which is fixed to the fuel passage formation portion 25 so as to bias the tank-side opening/closing member 31 in a direction in which the tank-side opening/closing member 31 is closed. The tank-side opening/closing member 31 is a flap valve which prevents the leakage of the liquid fuel from the fuel tank side to the insertion side. The tank-side spring 32 is fixed to the fuel passage formation portion 25 at a fixing end 32L, and is fixed to the tank-side opening/closing member 31 at a free end on the side opposite to the fixing end 32L. The tank-side spring 32 is turned about the fixing end 32L within the range of a predetermined angle so as to bias the tank-side opening/closing member 31 in a direction in which the nozzle insertion passage 100N is closed. When the filler neck 100 in the inclined posture shown in FIG. 3 has been fitted to the vehicle, the tank-side spring 32 is arranged such that in a state where the tank-side opening/closing mechanism 30 is closed, the fixing end 32L is on the upper side in a gravity direction as compared with the free end. The tank-side opening/closing mechanism 30 has a pressure adjustment mechanism in the tank-side opening/closing member 31 so as to adjust a fuel vapor pressure (tank internal pressure) within the fuel tank FT. Specifically, at the time of an internal pressure abnormality in which the tank internal pressure is higher or lower than a specified pressure, the tank-side opening/closing mechanism 30 adjusts the tank internal pressure by discharging air within the tank to the side of the nozzle insertion passage 100N or introducing the atmosphere from the nozzle insertion passage 100N into the tank.

The drainage mechanism 40 is fitted to the inner body 22 so as to be located between the outer body 21 and the inner body 22, and is continuous with the first opening 41 in the inner body 22. As shown in FIG. 4, the drainage mechanism 40 includes, from the side of the inner body 22, a rectangular annular seal member 45, a drainage port formation member 46, a drainage valve 47 and a holding member 48. The annular seal member 45 is an article molded of an oil-resistant robber, and receives the pressing force of the drainage port formation member 46 fitted to the first opening 41 in the inner body 22 so as to seal the first opening 41 over the opening region thereof.

Figure 5:
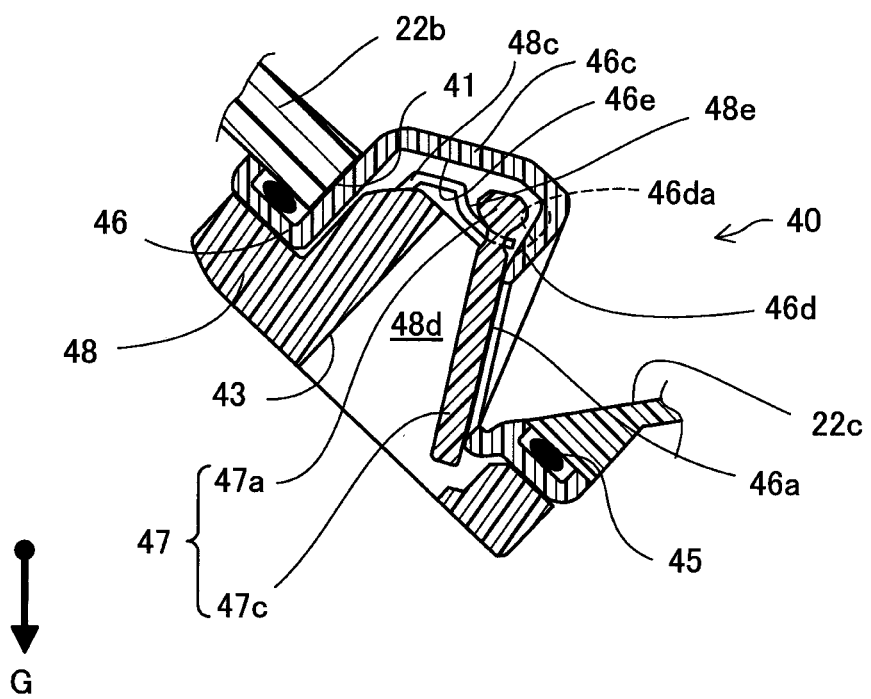
FIG. 5 is an illustrative view showing an enlarged cross section of a region in the vicinity of a drainage mechanism in FIG. 3.
Figure 6:
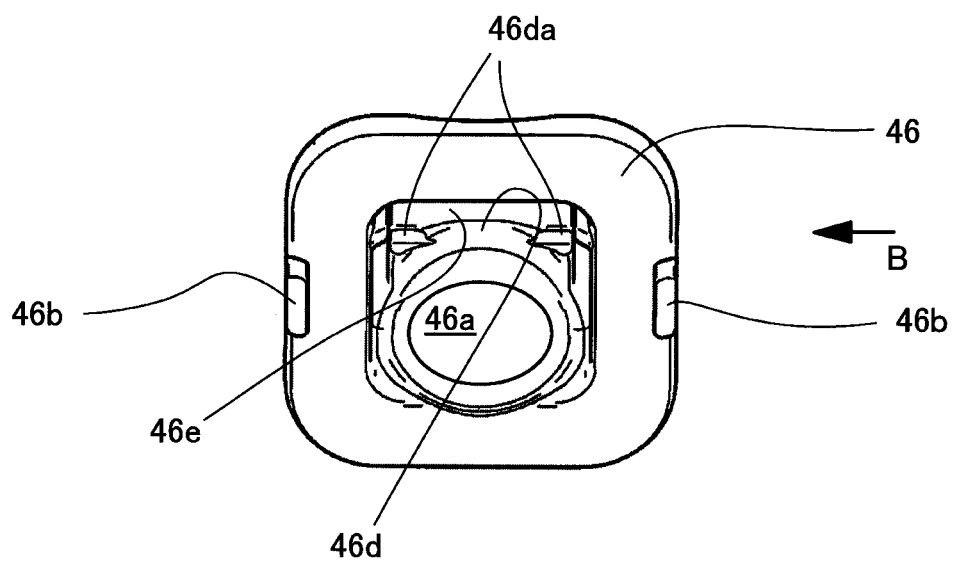
FIG. 6 is an illustrative view showing the drainage port formation member of the drainage mechanism when the drainage port formation member is seen in the direction of an arrow A in FIG. 3.
Figure 7:
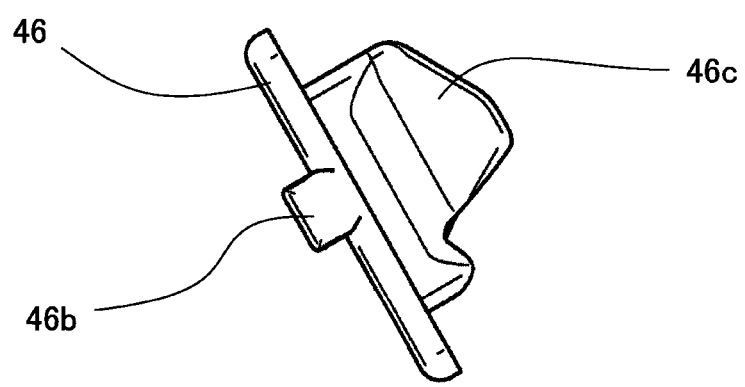
FIG. 7 is an illustrative view showing the drainage port formation member when the drainage port formation member is seen in the direction of an arrow B in FIG. 6.
Figure 8:
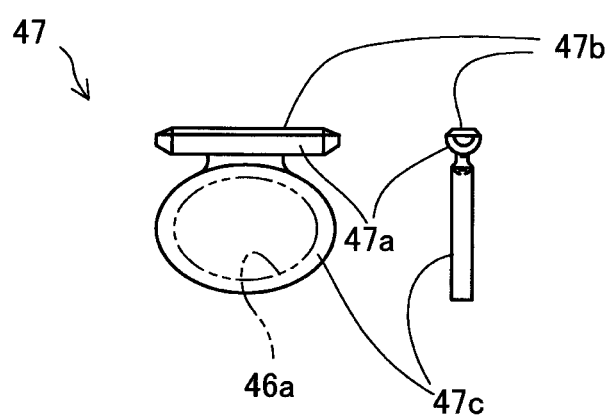
FIG. 8 is an illustrative view showing a drainage valve held with the holding member of the drainage mechanism as a front view in the direction of the arrow A in FIG. 3 and a right side view thereof.

FIG. 5 is an illustrative view showing an enlarged cross section of a region in the vicinity of the drainage mechanism 40 in FIG. 3. FIG. 6 is an illustrative view showing the drainage port formation member 46 of the drainage mechanism 40 when the drainage port formation member 46 is seen in the direction of an arrow A in FIG. 3. FIG. 7 is an illustrative view showing the drainage port formation member 46 when the drainage port formation member 46 is seen in the direction of an arrow B in FIG. 6. FIG. 8 is an illustrative view showing the drainage valve 47 held with the holding member 48 of the drainage mechanism 40 as a front view in the direction of the arrow A in FIG. 3 and a right side view thereof. As shown in FIGS. 3 and 4, the drainage port formation member 46 is fitted to the first opening 41. The drainage port formation member 46 which is fitted in this way is protruded in a direction extending from the first opening 41 toward the center axis OL of the nozzle insertion passage 100N, and includes a drainage port 46a in a recess wall 46c which is recessed on the side of the first opening 41. In the recess wall 46c, the region of a recess which is recessed and surrounded from the side of the first opening 41 is made to serve as a drainage passage 48d that is continuous with the second opening 42 of the outer body 21. In the drainage port formation member 46, as shown in the cross-sectional view of FIG. 3 and the enlarged cross-sectional view of FIG. 5, the drainage port 46a is surrounded by a tapered seating portion 46d, and a valve main body 47c in the drainage valve 47 which will be described later is received by an opening upper end surface of the drainage port 46a. As shown in the cross-sectional views of FIGS. 3 and 5, in the drainage passage 48d, the constituent members of the holding member 48 which will be described later are also located and the drainage valve 47 which will be described later is held on the recess wall 46c. Hence, the drainage passage 48d and the recess wall 46c will be described later together with the configurations of the holding member 48 and the drainage valve 47.

The direction of the arrow A in FIG. 3 coincides with the direction of an opening axis line orthogonal to the opening surface of the drainage port 46a. Hence, FIG. 6 shows a front view of the drainage port 46a. As shown in FIG. 6, the drainage port 46a is an elliptical opening in front view.

The drainage valve 47 which opens and closes the drainage port 46a of the elliptical opening includes, as shown in FIG. 8, a turning shaft 47a and the valve main body 47c. The valve main body 47c has an elliptical shape in front view, and the length of its long side parallel to the turning shaft 47a is longer than the length of its short side perpendicular to the turning shaft 47a. The drainage valve 47 of the present embodiment includes the valve main body 47c which is formed such that the length of the long side parallel to the turning shaft 47a is 1.1 to 1.5 times the length of the short side perpendicular to the turning shaft 47a. The drainage port 46a which is closed with the valve main body 47c of the drainage valve 47 is also an elliptical opening which corresponds to the elliptical shape of the valve main body 47c. The drainage port 46a is located at one end of the inclined wall portion 22c in the inner body 22 on the side of the first opening 41, and is continuous with the inclined wall portion 22c. Hence, the liquid entering the nozzle insertion passage 100N is guided from the nozzle insertion passage 100N to the inclined wall portion 22c, and flows toward the first opening 41 so as to reach the drainage port 46a by itself. The drainage port formation member 46 includes convex portions 46b on the side of the holding member 48. The convex portions 46b will be described in connection with the configuration of the holding member 48 which will be described later.

Figure 9:
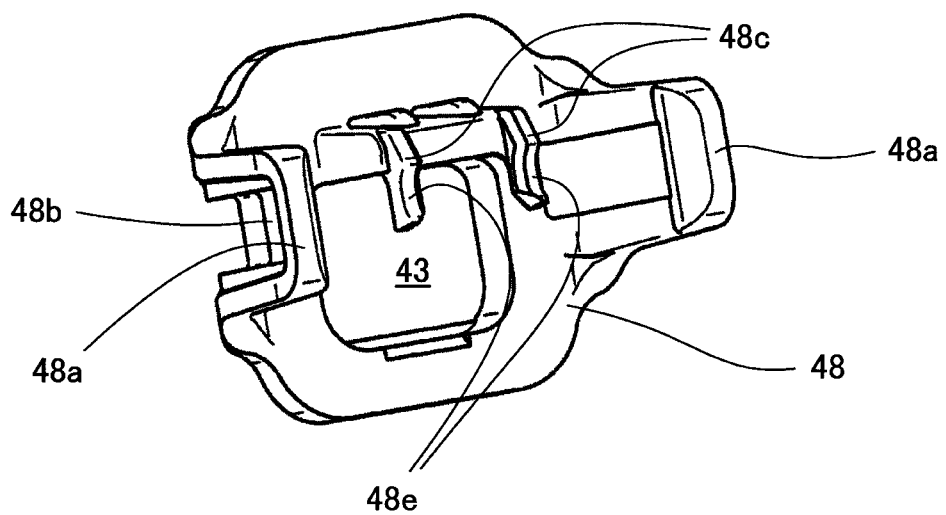
FIG. 9 is an illustrative view showing the holding member of the drainage mechanism when the holding member is seen in the direction of an arrow C in FIG. 4.

FIG. 9 is an illustrative view showing the holding member 48 of the drainage mechanism 40 when the holding member 48 is seen in the direction of an arrow C in FIG. 4. In the holding member 48, a center region of a frame member is a third opening 43, and the holding member 48 includes, as shown in FIG. 4, a convex portion 43a at the upper end of the third opening 43. In order to acquire the area of passage of the liquid which is passed through the drainage passage 48d so as to be discharged to the outside, the third opening 43 is formed such that the upper end of the opening is extended to the upper side in FIG. 10. In the third opening 43, in order to support holding pieces 48c which will be described later from the side of the third opening 43, the upper end side of the opening is narrowed in a lateral direction in front view, and thus opening shoulder portions 48f are formed in the narrowed parts. The convex portion 43a which is protruded from the upper end of the third opening 43 is protruded from the opening shoulder portions 48f on both side thereof downward in FIG. 10, that is, toward the upper surface of the valve main body 47c. The convex portion 43a is opposite the valve main body 47c of the drainage valve 47 which closes the drainage port 46a. Then, when the valve main body 47c is turned so as to open the drainage port 46a, the convex portion 43a makes contact with part of the upper surface of the valve main body 47c, specifically, an approximate center of the upper surface of the valve main body 47c so as to regulate the turning of the valve main body 47c. In other words, the convex portion 43a functions as a valve opening regulating portion in the present disclosure. In FIG. 5, the convex portion 43a is shown in cross section, and is formed so as to be extended in the shape of a stripe from the third opening 43 on the front surface side of the holding member 48 toward the opening back side. Since the direction in which the opening back side of the holding member 48 is extended toward the third opening 43 on the front surface side is the direction of the drainage, the convex portion 43a is extended along the direction of the drainage in the drainage passage 48d.

The holding member 48 includes two engagement arms 48a which are protruded from the frame member of the third opening 43 toward the drainage port formation member 46. The engagement arms 48a are flexible such that a distance over which they are opposite each other is extended, and have a pair of long engagement holes 48b from the base portions of the engagement arms to the tip end sides. Convex engagement protrusions 22d which are provided, in the inner body 22, around the first opening 41, specifically, on the protrusion wall portion 22b surrounding the first opening 41 are made to enter the engagement holes 48b, and thus the engagement arms 48a engage with the engagement protrusions 22d. In other words, in the holding member 48, the engagement arms 48a are engaged with the engagement protrusions 22d which are provided as engagement portions in the inner body 22, and thus the engagement arms 48a are made to function as engaged portions. The holding member 48 is fitted to the inner body 22 such that the drainage port formation member 46 which has been fitted to the first opening 41 of the inner body 22 as already described holds the fitted state. Specifically, the holding member 48 is fitted to the inner body 22 such that the engagement protrusions 22d of the inner body 22 engage with the engagement holes 48b of the engagement arms 48a, and thus the state where the drainage port formation member 46 is fitted to the first opening 41 is held. In the present embodiment, the engagement holes 48b are formed such that the base portions of the engagement arms 48a are cut out. Hence, in the state where the holding member 48 is fitted to the inner body 22, on the side of the base portion of the holding member 48, the convex portions 46b of the drainage port formation member 46 which have already been described engage with the engagement holes 48b.

As shown in FIG. 9, the holding member 48 includes a pair of holding pieces 48c on the side of the drainage port formation member 46. The holding pieces 48c are members for holding, with respect to the recess wall 46c of the drainage port formation member 46, the drainage valve 47 which opens and closes the drainage port 46a of the drainage port formation member 46. Specifically, the holding pieces 48c hold, in the state where the drainage port formation member 46 is fitted to the inner body 22 as already described, the turning shaft 47a with curved surface parts 48e which are curved so as to face the surface of the turning shaft 47a. In the turning shaft 47a, the side of the valve main body 47c is formed in the shape of a cylinder, and on the side opposite thereto, that is, on the side of the center axis OL, a flat portion 47b obtained by cutting out the cylinder is provided. The holding pieces 48c receive, with the curved surface parts 48e, the turning shaft 47a of the drainage valve 47 on the side of the cylindrical shaped portion, that is, on the side opposite to the flat portion 47b. The curved surface parts 48e are formed such that the curvature thereof is smaller than that of the cylindrical shaped portion of the turning shaft 47a. The turning shaft 47a of the drainage valve 47 is held such that the turning shaft 47a is able to slide on the side of the cylindrical shaped portion along the curved surface of the curved surface parts 48e, and then the turning shaft 47a serves as the base point of the turning of the valve main body 47c. In other words, the valve main body 47c is freely turned about the turning shaft 47a serving as the base point, and in the process of the turning of the valve main body 47c, the turning shaft 47a is able to slide on the side of the cylindrical shaped portion along the curved surfaces of the curved surface parts 48e. The turning shaft 47a is held with the holding pieces 48c so as to be located on the side of the center axis OL of the nozzle insertion passage 100N with respect to the valve main body 47c.

The drainage valve 47 which is incorporated in the recess wall 46c of the drainage port formation member 46 and which is held with the pair of holding pieces 48c closes the drainage port 46a with the valve main body 47c by its weight. In the closed state, as shown in FIG. 5, the valve main body 47c of the drainage valve 47 makes contact with the opening upper end surface of the drainage port 46a in the tapered seating portion 46d. The recess wall 46c of the drainage port formation member 46 is formed in a concave shape such that as shown in FIGS. 5 and 6, in the closed state of the drainage port 46a, the inner peripheral wall 46e of the recess wall 46c is prevented from making contact with the turning shaft 47a of the drainage valve 47. Moreover, as shown in FIGS. 5 and 6, the drainage port formation member 46 includes groove portions 46da in the tapered inclined surface of the seating portion 46d. The groove portions 46da are formed so as to be sunk in both ends of the drainage port 46a in front view as shown in FIG. 6. Here, a description will be given in connection with the drainage valve 47 held with the holding pieces 48c as already described, and the groove portions 46da are formed so as to be sunk in the tapered inclined surface of the seating portion 46d on the sides of both ends of the turning shaft 47a of the drainage valve 47 in an axial direction, and thus the non-contact region of the turning shaft 47a with the inner peripheral wall 46e of the recess wall 46c is expanded. By the expansion of the non-contact region, the valve main body 47c is turned about the turning shaft 47a serving as the base point without fail. Here, a more detailed description will be given, and when the turning shaft 47a slides on the side of the cylindrical shaped portion along the curved surfaces of the curved surface parts 48e of the pair of holding pieces 48c as already described, the condition of the sliding may differ between one end side and the other end side of the turning shaft 47a. In this state, the turning shaft 47a is inclined such that one end in the axial direction is closer to the taped inclined surface of the seating portion 46d than the other end. Even when the turning shaft 47a is inclined as described above, the end portion of the turning shaft which is closer to the taped inclined surface of the seating portion 46d is prevented from making contact with the inner peripheral wall 46e of the recess wall 46c due to the groove portions 46da. Hence, the valve main body 47c is turned about the turning shaft 47a serving as the base point without fail as already described.

On the other hand, when the liquid flows from the nozzle insertion passage 100N through the inclined wall portion 22c to the first opening 41 as already described, the valve main body 47c is pushed by the liquid so as to be turned about the turning shaft 47a serving as the base point, and thus the drainage port 46a is opened. The drainage valve 47 which is pushed by the liquid so as to open the drainage port 46a is turned such that the valve main body 47c is moved close to the convex portion 43a in the third opening 43 of the holding member 48. In other words, the valve main body 47c of the drainage valve 47 is turned such that its contact part with the convex portion 43a serves as a turning end, and the convex portion 43a functions as a stopper for the drainage valve 47.

In the holding member 48, in the state where the holding member 48 is fitted to the inner body 22 as already described so as to hold the drainage port formation member 46, as shown in FIG. 3, the third opening 43 is continuous with the second opening 42 of the outer body 21. Then, in the holding member 48, the already described recess region of the recess wall 46c between the third opening 43 and the drainage port 46a in the drainage port formation member 46 serves as the drainage passage 48d for the liquid flowing from the drainage port 46a to the second opening 42. Moreover, in the holding member 48, in the process in which the holding member 48 is fitted to the inner body 22 as already described, the convex portions 46b of the drainage port formation member 46 enter the engagement holes 48b from the tip end sides of the engagement arms 48a. As the fitting of the holding member 48 to the inner body 22 proceeds, the convex portions 46b reach the sides of the base portions of the engagement holes 48b while entering the engagement holes 48b. In this way, the convex portions 46b function as locating portions for determining the posture of the holding member 48 when the holding member 48 engages with the inner body 22. In the holding member 48, the convex portion 46b and the engagement protrusion 22d are engaged with the engagement hole 48b in different positions of the engagement hole 48b. Hence, the number of holes with which the convex portion 46b and the engagement protrusion 22d engage is able to be only one, and thus the shape of the holding member 48 is able to be simplified.

Figure 10:
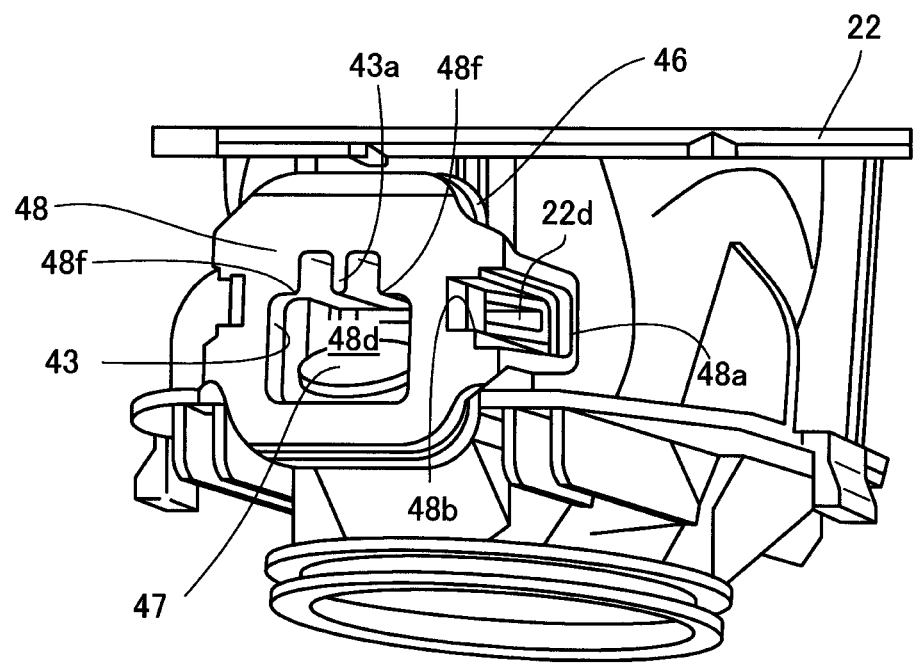
FIG. 10 is an illustrative view showing a state where the components of the main parts of the opening/closing device are assembled to each other when they are seen in the direction of an arrow D in FIG. 4.

FIG. 10 is an illustrative view showing a state where the components of the main parts of the opening/closing device 20 are assembled to each other when they are seen in the direction of an arrow D in FIG. 4. As shown in the figure, in a state where the drainage port 46a (see FIG. 4) is closed with the drainage valve 47, the drainage port formation member 46 and the holding member 48 are assembled and fitted to the inner body 22 as already described. Then, in a so-called temporarily assembled state where the drainage port formation member 46 and the holding member 48 hold the drainage valve 47, the inner body 22 is incorporated into the outer body 21 together with the insertion port opening/closing mechanism 10 and the annular member 15. Specifically, the inner body 22 is incorporated into the outer body 21 such that the third opening 43 of the holding member 48 shown in FIG. 9 is overlaid on the second opening 42 of the outer body 21. In other words, as long as the drainage port formation member 46 and the holding member 48 are able to be temporarily assembled, the strict strength design and the like of these members are not necessary, with the result that the design of the product is able to be simplified.

In the filler neck 100 which includes the opening/closing device 20 of the present embodiment described above, when the fluid flows from the nozzle insertion passage 100N formed with the inner body 22 toward the first opening 41, the liquid reaches the drainage port 46a of the drainage mechanism 40 which is incorporated between the outer body 21 and the inner body 22. In this case, as shown in FIG. 3, in the fitted posture in which the filler neck 100 is fitted to the vehicle, the filler neck 100 including the opening/closing device 20 of the present embodiment is in the inclined posture in which the filler neck 100 is inclined with respect to the vertical direction at the predetermined inclination angle θ1 (30° to 50°), and the inclined wall portion 22c is inclined such that the end of the inclined wall portion 22c on the side of the first opening 41 is located lower vertically than the end on the side of the nozzle insertion passage 100N. Hence, in the opening/closing device 20, the liquid such as rain water which enters the nozzle insertion passage 100N from the sunk recess 11a and the communication port 21c is passed out toward the first opening 41 with the inclined wall portion 22c that is inclined as already described by utilization of the weight of the liquid itself so as to reach the drainage port 46a. In the filler neck 100 including the opening/closing device 20 of the present embodiment, as shown in FIG. 3, the inclination angle θ2 of the inclined wall portion 22c which is inclined with respect to a horizontal direction such that the end on the side of the first opening 41 is located lower vertically than the end on the side of the nozzle insertion passage 100N is set to 2° to 5° from the horizontal direction toward the lower side. In this way, it is possible to acquire the flow of the liquid from the nozzle insertion passage 100N through the inclined wall portion 22c into the first opening 41. Hence, the efficiency of drainage of the liquid entering the nozzle insertion passage 100N is enhanced. Since the inclined wall portion 22c passes the liquid from the nozzle insertion passage 100N to the first opening 41 such as by vibrations of the vehicle so as to drain the liquid even if the inclination angle θ2 thereof is 0°, the inclination angle θ2 of the inclined wall portion 22c is preferably 2° to 5° from the horizontal direction toward the lower side.

In the filler neck 100 which includes the opening/closing device 20 of the present embodiment, when the drainage valve 47 is pushed by the liquid reaching the drainage port 46a, the drainage port 46a is opened with the drainage valve 47. Then, the liquid which pushes and opens the drainage valve 47 is passed through the drainage passage 48d of the recess region in the recess wall 46c, reaches the third opening 43 of the holding member 48 and then flows to the second opening 42 of the outer body 21 which is continuous with the third opening 43. Since the second opening 42 is formed in the circumferential wall 21a surrounding the inner body 22 so as to be open to the atmosphere, the liquid flowing to the second opening 42 is drained from the second opening 42 to the outside of the opening/closing device 20.

The drainage mechanism 40 which involves the drainage of the liquid from the first opening 41 of the inner body 22 to the second opening 42 of the outer body 21 is arranged only between the outer body 21 and the inner body 22 which is incorporated therein, that is, in the region where the inner body 22 is incorporated. Hence, as long as in the outer body 21 of the opening/closing device 20, the second opening 42 which is open to the atmosphere is formed in the circumferential wall 21*a*, the part where the drainage passage for the drainage of the liquid is formed does not need to be provided so as to be protruded to the outside of the device. Moreover, in the opening/closing device 20 of the present embodiment, the drainage valve 47 for opening and closing the drainage port 46*a* is held with the holding pieces 48*c* in the drainage passage 48*d* of the recess region of the recess wall 46*c* which is protruded from the side of the first opening 41 to the side of the center axis OL of the nozzle insertion passage 100N so as to be recessed. As the region where the drainage valve 47 is held is extended from the side of the first opening 41 to the side of the outer body 21, the region where the drainage mechanism 40 is incorporated is extended to the side of the outer body 21. In the opening/closing device 20 of the present embodiment, since the drainage valve 47 is held in the drainage passage 48*d* of the recess region of the recess wall 46*c* which is protruded to the side of the center axis OL of the nozzle insertion passage 100N so as to be recessed, the extension of the region where the drainage mechanism 40 is incorporated is able to be reduced. Consequently, in the filler neck 100 including the opening/closing device 20 of the present embodiment, the liquid entering the nozzle insertion passage 100N is able to be reliably drained, and furthermore, it is possible to prevent the outer body 21 of the opening/closing device 20 from being protruded to the outside of the device or to reliably reduce the degree of the protrusion.

In the opening/closing device 20 of the present embodiment, the drainage valve 47 opens and closes the drainage port 46*a* by turning of the valve main body 47*c* about the turning shaft 47*a* serving as the base point. The turning shaft 47*a* is located on the side of the center axis OL of the nozzle insertion passage 100N so as to be held, and thus the drainage valve 47 is held. The drainage valve 47 held in this way closes the drainage port 46*a* in a state where the liquid does not reach the drainage port 46*a*, and when the liquid reaches the drainage port 46*a*, the drainage valve 47 is pushed by the liquid so as to open the drainage port 46*a*. When the drainage port 46*a* is opened, the valve main body 47*c* is turned about the turning shaft 47*a* serving as the base point. When the convex portion 43*a* makes contact with part of the upper surface of the valve main body 47*c* so as to restrict the turning of the valve main body 47*c*, the valve main body 47*c* is brought into a state where the turning is stopped. In the state where the turning is stopped, the convex portion 43*a* makes contact with the part of the upper surface of the valve main body, and thus the valve main body 47*c* of the drainage valve 47 is prevented from entering a gap in peripheral members surrounding the drainage valve 47, specifically, a gap in the opening shoulder portions 48*f* on both sides of the convex portion 43*a* shown in FIG. 10. Consequently, in the opening/closing device 20 of the present embodiment, the liquid entering the nozzle insertion passage 100N is able to be reliably drained, and furthermore, it is possible to acquire the movability of the drainage valve 47 which opens the drainage port 46*a*.

In the filler neck 100 including the opening/closing device 20 of the present embodiment, the turning shaft 47*a* of the drainage valve 47 is held with the curved surface parts 48*e* of the pair of holding pieces 48*c* which are curved so as to face the surface of the turning shaft 47*a*. Hence, in the filler neck 100 including the opening/closing device 20 of the present embodiment, the drainage valve 47 is able to be smoothly turned about the turning shaft 47*a* serving as the base point. Moreover, even when the turning shaft 47*a* slides along the curved surfaces of the curved surface parts 48*e* in the pair of holding pieces 48*c* so as to be inclined, the turning shaft 47*a* is prevented from making contact with the inner peripheral wall 46*e* of the recess wall 46*c* in the drainage port formation member 46 due to the groove portions 46*da*. In other words, even when the turning shaft 47*a* slides so as to be inclined, the valve main body 47*c* is smoothly turned about the turning shaft 47*a* serving as the basic point without fail. Consequently, the degree of drainage of the liquid entering the nozzle insertion passage 100N is more enhanced.

In the filler neck 100 including the opening/closing device 20 of the present embodiment, in the drainage passage 48*d* of the recess wall 46*c* of the drainage port formation member 46, the valve main body 47*c* of the drainage valve 47 is received by the opening upper end surface of the drainage port 46*a* formed with the seating portion 46*d*. Furthermore, in the filler neck 100, the drainage valve 47 is held such that the turning shaft 47*a* is prevented from making contact with the inner wall surface of the recess wall 46*c*. Hence, in the filler neck 100 including the opening/closing device 20 of the present embodiment, the valve main body 47*c* is able to be more smoothly turned about the turning shaft 47*a* serving as the basic point, and thus the degree of the drainage is able to be more enhanced.

In the opening/closing device 20 of the present embodiment, the valve main body 47*c* which is turned, for opening and closing the drainage port 46*a*, about the turning shaft 47*a* serving as the base point located on the side of the center axis OL of the nozzle insertion passage 100N is formed, in front view, in the shape of an ellipse whose side perpendicular to the turning shaft 47*a* is a short side. The length of the valve main body in a direction perpendicular to the turning shaft 47*a* specifies the extension of the region where the drainage mechanism 40 is incorporated from the center axis OL of the nozzle insertion passage 100N. In the opening/closing device 20 of the present embodiment, the length of the valve main body in the direction perpendicular to the turning shaft 47*a* is set shorter than the length of the valve main body in a direction parallel to the turning shaft 47*a*, and thus the extension of the region where the drainage mechanism 40 is incorporated is able to be reduced. The drainage port 46*a* is the elliptical opening corresponding to the valve main body 47*c*, and thus it is possible to acquire the area of the opening capable of reliably draining the liquid entering the nozzle insertion passage 100N. Consequently, in the filler neck 100 including the opening/closing device 20 of the present embodiment, the liquid entering the nozzle insertion passage 100N is able to be reliably drained, and furthermore, it is possible to prevent the outer body 21 of the opening/closing device 20 from being protruded to the outside of the device or to more reliably reduce the degree of the protrusion. Moreover, in the filler neck 100 including the opening/closing device 20 of the present embodiment, it is possible to prevent or reduce contact with the drainage mechanism 40 from the outside.

In the filler neck 100 including the opening/closing device 20 of the present embodiment, the turning shaft 47*a* of the drainage valve 47 includes the flat portion 47*b* on the side of the center axis OL with respect to the center of the turning shaft 47*a*, and thus the extension of the region where the drainage mechanism 40 is incorporated from the center axis OL of the nozzle insertion passage 100N is able to be more reduced only by an extent corresponding to part which is cut out from the turning shaft 47a so as to form the flat portion 47b. Hence, in the filler neck 100 including the opening/closing device 20 of the present embodiment, the protrusion of the outer body 21 of the opening/closing device 20 to the outside of the device is able to be more reduced, and furthermore, it is possible to more reliably prevent or reduce contact with the drainage mechanism 40 from the outside.

In the filler neck 100 including the opening/closing device 20 of the present embodiment, the valve main body 47c of the drainage valve 47 is formed in the shape of the ellipse in which the length of the long side parallel to the turning shaft 47a is 1.1 to 1.5 times the length of the short side perpendicular to the turning shaft 47a. Furthermore, the inclined wall portion 22c for guiding the liquid toward the first opening 41 of the inner body 22 is inclined at the predetermined inclination angle θ2 (2° to 5°) with respect to the horizontal direction such that as already described, in the state where the filler neck 100 is inclined so as to be fitted to the vehicle, the end on the side of the first opening 41 is located lower vertically than the end on the side of the nozzle insertion passage 100N. Hence, in the filler neck 100 including the opening/closing device 20 of the present embodiment, it is possible to more reliably reduce the extension of the region where the drainage mechanism 40 is incorporated, and furthermore, it is possible to reliably drain the liquid entering the nozzle insertion passage 100N through the inclined wall portion 22c which is inclined.

In the filler neck 100 including the opening/closing device 20 of the present embodiment, with the outer body 21 to which the inner body 22 is assembled, the drainage mechanism 40 is held from the outside to the inner body 22. Hence, in the filler neck 100 including the opening/closing device 20 of the present embodiment, it is possible to reliably hold the drainage mechanism 40 from the outside of the device, and furthermore, it is possible to prevent an external force from being directly applied to the drainage mechanism 40.

In the filler neck 100 including the opening/closing device 20 of the present embodiment, in the drainage port formation member 46, the convex portions 46b are provided which determine the posture of the holding member 48 when the engagement arms 48a of the holding member 48 engage with the engagement protrusions 22d of the inner body 22. Hence, in the filler neck 100 including the opening/closing device 20 of the present embodiment, it is possible to easily assemble the drainage mechanism 40 configured with the drainage port formation member 46 and the holding member 48 to the first opening 41 of the inner body 22.

In the filler neck 100 including the opening/closing device 20 of the present embodiment, the engagement protrusions 22d are provided in the inner body 22, and the engagement arms 48a in which the engagement protrusions 22d enter the engagement holes 48b such that they engage with each other are provided in the drainage port formation member 46. Hence, in the filler neck 100 including the opening/closing device 20 of the present embodiment, in a state before the inner body 22 is fitted to the outer body 21, the drainage mechanism 40 configured with the drainage port formation member 46 and the holding member 48 is able to be easily assembled to the first opening 41 of the inner body 22.

In the filler neck 100 including the opening/closing device 20 of the present embodiment, the fuel passage 100P for guiding the liquid fuel supplied from the refueling nozzle FN to the fuel tank FT is formed with the fuel passage formation portion 25, and the fuel passage formation portion 25 is provided through the under body 23 in the inner body 22 such that the fuel passage 100P is continuous with the nozzle insertion passage 100N of the inner body 22. Moreover, the opening/closing device 20 of the present embodiment includes, in the part in which the fuel passage 100P is continuous with the nozzle insertion passage 100N, the tank-side opening/closing mechanism 30 for opening and closing the nozzle insertion passage 100N, and includes, in the outer body 21 and the insertion port opening/closing mechanism 10, the communication port 21c which makes the nozzle insertion passage 100N communicate with the atmosphere in the circumferential wall of the nozzle insertion port 104 and the sunk recess 11a. Hence, in the opening/closing device 20 of the present embodiment, the filler neck 100 for guiding the fuel supplied from the refueling nozzle FN to the fuel tank FT is able to be provided in a state where the filler neck 100 includes the opening/closing device 20, and when an internal pressure abnormality occurs in the fuel tank FT, the tank-side opening/closing mechanism 30 releases a state where the valve is closed so as to be able to discharge air within the tank to the atmosphere from the communication port 21c in the circumferential wall of the nozzle insertion port 104 and the sunk recess 11a of the insertion port opening/closing member 11.

The present disclosure may be realized in various aspects. For example, the present disclosure may be realized in an embodiment of a fuel tank which includes an opening/closing device of the fuel tank, in an embodiment of a filler neck which includes an opening/closing device of a fuel tank and in an embodiment of a method of manufacturing an opening/closing device of a fuel tank.

Other Embodiments

Although in the embodiment described above, the drainage valve 47 is held with the curved surface parts 48e of the holding pieces 48c which face the surface of the turning shaft 47a, instead of the curved surface parts 48e, the turning shaft 47a may be held with concave wall surface parts which are recessed in the shape of the letter V.

Although in the embodiment described above, the seating portion 46d which receives the valve main body 47c is tapered, as long as the turning shaft 47a does not make contact with the inner wall surface of the recess wall 46c, there is no limitation to a tapered shape. For example, a seating portion 46d may be provided that includes an annular convex portion which is annularly raised in the opening portion of the drainage port 46a.

Although in the embodiment described above, the valve main body 47c of the drainage valve 47 is formed in the shape of the ellipse whose long side is in the direction parallel to the turning shaft 47a, as long as the length of the valve main body in the direction parallel to the turning shaft 47a is longer than the length of the valve main body in the direction perpendicular to the turning shaft 47a, there is no limitation to an elliptical shape. For example, as the valve main body 47c, a rectangular valve main body may be provided in which the length of the valve main body in the direction parallel to the turning shaft 47a is longer than the length of the valve main body in the direction perpendicular to the turning shaft 47a.

Although in the embodiment described above, the drainage port 46a is the opening which is formed in an elliptical shape corresponding to the valve main body 47c in the shape of the ellipse, as long as the drainage port 46a is an opening which has such a shape that the opening is able to be opened and closed with the valve main body 47c, there is no limitation to an elliptical shape. For example, the drainage port 46a may be a rectangular opening corresponding to a rectangular valve main body 47c or may be a rectangular opening which is able to be opened and closed with the valve main body 47c in an elliptical shape.

Although in the embodiment described above, the convex portions 46b are provided in the drainage port formation member 46, and when the holding member 48 is fitted to the inner body 22, the convex portions 46b enter the engagement holes 48b so as to determine the posture of the holding member 48, there is no limitation to such a configuration. For example, a distance between the engagement arms 48a in the holding member 48 is specified so as to correspond to the dimension of the drainage port formation member 46 in the width direction, and thus the posture of the holding member 48 when the holding member 48 is fitted to the inner body 22 may be determined.

Although in the embodiment described above, the fuel passage formation portion 25 which forms the fuel passage 100P for guiding the liquid fuel supplied from the refueling nozzle FN to the fuel tank FT and the tank-side opening/closing mechanism 30 which opens and closes the nozzle insertion passage 100N are provided, there is no limitation to such a configuration. For example, an opening/closing device 20 which includes only the tank-side opening/closing mechanism 30 may be provided. Specifically, not the embodiment of the filler neck 100 which includes, in addition to the opening/closing device 20, the tank-side opening/closing mechanism 30 and the fuel passage formation portion 25 but an embodiment of the opening/closing device 20 may be provided.

1. The present disclosure disclosed may be realized as the following embodiments.

(1) According to an embodiment of an opening/closing device of a fuel tank, an opening/closing device of a fuel tank is provided. The opening/closing device of the fuel tank includes: a housing that includes: a passage circumferential wall which surrounds a nozzle insertion passage for a refueling nozzle; and a first opening which is formed in the passage circumferential wall and through which the nozzle insertion passage is open to the atmosphere; a cover main body in which the housing is incorporated and which includes: a circumferential wall that surrounds the housing; a second opening that is formed in the circumferential wall, that is opposite the first opening and that is open to the atmosphere; and a nozzle insertion port for the refueling nozzle that is formed in a ceiling wall of the circumferential wall; an insertion port opening/closing mechanism which opens and closes the nozzle insertion port; and a drainage mechanism which is fitted to the housing so as to be continuous with the first opening and which is located between the cover main body and the housing, the drainage mechanism includes: a drainage port formation member which includes a drainage port for a liquid that flows from the nozzle insertion passage toward the first opening and which is fitted to the first opening such that the liquid reaches the drainage port; and a holding member which is fitted to the housing so as to hold a state where the drainage port formation member is fitted to the first opening and which holds a drainage valve for opening and closing the drainage port to the drainage port formation member and the holding member includes: a third opening which is continuous with the second opening, a drainage passage which is formed between the third opening and the drainage port; and an engaged portion which engages with an engagement portion that is provided on the passage circumferential wall around the first opening in the housing.

In the opening/closing device of the fuel tank according to this embodiment, when the liquid flows from the nozzle insertion passage formed with the housing toward the first opening, the liquid reaches the drainage port of the drainage mechanism between the cover main body and the housing. Then, when the drainage port is opened with the drainage valve, the liquid is passed through the drainage passage of the holding member of the drainage mechanism, reaches the third opening of the holding member and flows into the second opening of the cover main body which is continuous with the third opening. Since the second opening is formed in the circumferential wall surrounding the housing so as to be open to the atmosphere, the liquid flowing to the second opening is able to be drained from the second opening to the outside of the device without fail.

When the liquid is drained to the outside of the device without fail in this way, the drainage mechanism which involves the drainage of the liquid from the first opening to the second opening is provided between the cover main body and the housing incorporated therein, that is, the region where the housing is incorporated. Hence, in the cover main body serving as the outer body of the opening/closing device of the fuel tank, as long as the second opening which is open to the atmosphere is formed in the circumferential wall, the part where the drainage passage is formed does not need to be provided so as to be protruded to the outside of the device. Consequently, in the opening/closing device of the fuel tank according to this embodiment, it is possible to prevent or reduce contact with the drainage mechanism from the outside, and furthermore, it is possible to prevent the cover main body serving as the outer body of the opening/closing device from being protruded to the outside of the device or reduce the degree of the protrusion.

(2) In the opening/closing device of the fuel tank according to the embodiment described above, the drainage port formation member may include a locating portion which determines the posture of the holding member when the engaged portion of the holding member engages with the engagement portion of the housing. In this way, it is possible to easily assemble the drainage mechanism to the first opening of the housing.

(3) In the opening/closing device of the fuel tank according to the embodiment described above, the housing may include, as the engagement portion, an engagement protrusion, and the holding member may include, as the engaged portion, an engagement arm which engages with the engagement protrusion. In this way, it is possible to easily assemble the drainage mechanism to the first opening of the housing in a state where the housing is fitted to the body.

(4) The opening/closing device of the fuel tank according to the embodiment described above may further include: a fuel passage formation portion which forms a fuel passage that guides a liquid fuel supplied from the refueling nozzle to the fuel tank; and a tank-side opening/closing mechanism which opens and closes the fuel passage, the fuel passage formation portion may be provided such that the fuel passage is continuous with the nozzle insertion passage of the housing, the tank-side opening/closing mechanism may be provided in part in which the fuel passage is continuous with the nozzle insertion passage and at least one of the cover main body and the insertion port opening/closing mechanism may include a communication port which makes the nozzle insertion passage communicate with the atmosphere in a circumferential wall of the nozzle insertion port. In this way, it is possible to provide the filler neck which guides the fuel supplied from the refueling nozzle to the fuel tank in a state where the filler neck includes the opening/closing device, and furthermore, it is possible to discharge air within the tank flowing from the side of the fuel passage to the side of the nozzle insertion passage to the atmosphere from the communication port in the circumferential wall of the nozzle insertion port.

2. The present disclosure disclosed may also be realized as the following embodiments.

(1) According to an embodiment of an opening/closing device of a fuel tank, an opening/closing device of a fuel tank is provided. The opening/closing device of the fuel tank includes: a housing that includes: a passage circumferential wall which surrounds a nozzle insertion passage for a refueling nozzle; and a first opening which is formed in the passage circumferential wall and through which the nozzle insertion passage is open to the atmosphere; a cover main body in which the housing is incorporated and which includes: a circumferential wall that surrounds the housing; a second opening that is formed in the circumferential wall, that is opposite the first opening and that is open to the atmosphere; and a nozzle insertion port for the refueling nozzle that is formed in a ceiling wall of the circumferential wall; an insertion port opening/closing mechanism which opens and closes the nozzle insertion port; and a drainage mechanism which is fitted to the housing so as to be continuous with the first opening and which is located between the cover main body and the housing, the drainage mechanism includes: a drainage passage which is extended from the first opening to the second opening and which is provided so as to make a drainage port for a liquid flowing from the nozzle insertion passage toward the first opening continuous with the first opening; and a drainage valve which includes a turning shaft and a valve main body and which opens and closes the drainage port by turning of the valve main body about the turning shaft, the turning shaft is arranged in the drainage passage so as to be located on the side of a center axis of the nozzle insertion passage with respect to the valve main body, the length of the valve main body in a direction parallel to the turning shaft is longer than the length thereof in a direction perpendicular to the turning shaft in front view and the drainage port is an opening which has such a shape that the opening is able to be opened and closed with the valve main body.

In the opening/closing device of the fuel tank according to this embodiment, when the liquid flows from the nozzle insertion passage formed with the housing toward the first opening, the liquid reaches the drainage port of the drainage mechanism between the cover main body and the housing. Then, when the drainage port is opened with the drainage valve, the liquid is passed through the drainage passage so as to flow into the second opening in the cover main body opposite the first opening. The second opening is formed in the circumferential wall surrounding the housing so as to be open to the atmosphere, and thus the liquid flowing to the second opening is able to be drained from the second opening to the outside of the device without fail.

The drainage mechanism which involves the drainage of the liquid from the first opening to the second opening is provided between the cover main body and the housing incorporated therein, that is, the region where the housing is incorporated. Hence, in the cover main body serving as the outer body of the opening/closing device of the fuel tank, as long as the second opening which is open to the atmosphere is formed in the circumferential wall, the part where the drainage passage is formed does not need to be provided so as to be protruded to the outside of the device. Moreover, in the opening/closing device of the fuel tank according to this embodiment, the valve main body which is turned, for opening and closing the drainage port, about the turning shaft located on the side of the center axis of the nozzle insertion passage is formed in such a shape that the length in the direction parallel to the turning shaft is longer than the length in the direction perpendicular to the turning shaft in front view. In the lengths of the valve main body described above, the length of the valve main body perpendicular to the turning shaft specifies the extension of the region where the drainage mechanism is incorporated from the center axis of the nozzle insertion passage. In the opening/closing device of the fuel tank according to this embodiment, the length of the valve main body perpendicular to the turning shaft is set shorter than the length thereof in the direction parallel to the turning shaft, and thus the extension of the region where the drainage mechanism is incorporated is able to be reduced. The drainage port is the opening which has a shape corresponding to the valve main body, and thus it is possible to acquire the area of the opening capable of reliably draining the liquid entering the nozzle insertion passage. Consequently, in the opening/closing device of the fuel tank according to this embodiment, the liquid entering the nozzle insertion passage is able to be reliably drained, and furthermore, it is possible to prevent the cover main body serving as the outer body of the opening/closing device from being protruded to the outside of the device or to more reliably reduce the degree of the protrusion. Moreover, in the opening/closing device of the fuel tank according to this embodiment, it is possible to prevent or reduce contact with the drainage mechanism from the outside.

(2) In the opening/closing device of the fuel tank according to the embodiment described above, the turning shaft may include a flat portion on the side of the center axis with respect to the center of the turning shaft. In this way, the extension of the region where the drainage mechanism is incorporated from the center axis of the nozzle insertion passage is able to be more reduced only by an extent corresponding to part which is cut out from the turning shaft so as to form the flat portion. Hence, the protrusion of the cover main body serving as the outer body of the opening/closing device to the outside of the device is able to be more reduced, and furthermore, it is possible to more reliably prevent or reduce contact with the drainage mechanism from the outside.

(3) In the opening/closing device of the fuel tank according to the embodiment described above, the length of the valve main body in the direction parallel may be 1.1 to 1.5 times the length thereof in the direction perpendicular, the housing may include a liquid guide portion which guides the liquid toward the first opening and the liquid guide portion may be inclined in a state where the opening/closing device is fitted to a refueling chamber of a vehicle such that one of both ends of the liquid guide portion ($22c$) on the side of the first opening is located lower vertically than the end on the side of the nozzle insertion passage. In this way, it is possible to more reliably reduce the extension of the region where the drainage mechanism is incorporated, and furthermore, it is possible to reliably drain the liquid entering the nozzle insertion passage through the liquid guide portion which is inclined.

(4) In the opening/closing device of the fuel tank according to the embodiment described above, the cover main body may hold, from the outside, the drainage mechanism with respect to the housing. In this way, it is possible to reliably hold the drainage mechanism from the outside of the device, and furthermore, it is possible to prevent an external force from being directly applied to the drainage mechanism.

3. The present disclosure disclosed may be further realized as the following embodiments.

(1) According to an embodiment of an opening/closing device of a fuel tank, an opening/closing device of a fuel tank is provided. The opening/closing device of the fuel tank includes: a housing that includes: a passage circumferential wall which surrounds a nozzle insertion passage for a refueling nozzle; and a first opening which is formed in the passage circumferential wall and through which the nozzle insertion passage is open to the atmosphere; a cover main body in which the housing is incorporated and which includes: a circumferential wall that surrounds the housing; a second opening that is formed in the circumferential wall, that is opposite the first opening and that is open to the atmosphere; and a nozzle insertion port for the refueling nozzle that is formed in a ceiling wall of the circumferential wall; an insertion port opening/closing mechanism which opens and closes the nozzle insertion port; and a drainage mechanism which is located between the cover main body and the housing so as to drain a liquid from the nozzle insertion passage, the drainage mechanism includes: a drainage port formation member which includes a recess wall that is fitted to the first opening, that is protruded from the first opening toward a center axis of the nozzle insertion port and that forms a recess recessed on the side of the first opening so as to make the recess continuous with the second opening and in which in the recess wall, a drainage port for the liquid flowing from the nozzle insertion passage toward the first opening is formed; a drainage valve which includes a turning shaft and a valve main body and which opens and closes the drainage port by turning of the valve main body about the turning shaft serving as a base point; and a holding member which includes a holding piece that holds the turning shaft with respect to the recess wall.

In the opening/closing device of the fuel tank according to this embodiment, when the liquid flows from the nozzle insertion passage formed with the housing toward the first opening, the liquid reaches the drainage port of the drainage mechanism between the cover main body and the housing. Then, when the drainage port is opened with the drainage valve, the liquid is passed through the recess so as to flow into the second opening of the cover main body opposite the first opening of the housing. Since the second opening is formed in the circumferential wall surrounding the housing so as to be open to the atmosphere, the liquid flowing to the second opening is able to be drained from the second opening to the outside of the device without fail.

The drainage mechanism which involves the drainage of the liquid from the first opening to the second opening is provided between the cover main body and the housing incorporated therein, that is, the region where the housing is incorporated. Hence, in the cover main body serving as the outer body of the opening/closing device of the fuel tank, as long as the second opening which is open to the atmosphere is formed in the circumferential wall, the part where the drainage passage is formed does not need to be provided so as to be protruded to the outside of the device. Moreover, in the opening/closing device of the fuel tank according to this embodiment, the drainage valve for opening and closing the drainage port is held with the holding piece in the recess which is protruded from the side of the first opening to the side of the center axis of the nozzle insertion port so as to be recessed. As the region where the drainage valve is held is extended from the side of the first opening to the side of the cover main body, the region where the drainage mechanism is incorporated is extended to the side of the cover main body. In the opening/closing device of the fuel tank according to this embodiment, since the drainage valve is held in the recess which is protruded to the side of the center axis of the nozzle insertion port so as to be recessed, the extension of the region where the drainage mechanism is incorporated is able to be reduced. Consequently, in the opening/closing device of the fuel tank according to this embodiment, the liquid entering the nozzle insertion passage is able to be reliably drained, and furthermore, it is possible to prevent the cover main body serving as the outer body of the opening/closing device from being protruded to the outside of the device or to more reliably reduce the degree of the protrusion.

(2) In the opening/closing device of the fuel tank according to the embodiment described above, the holding piece may hold the turning shaft with a curved surface part that faces the surface of the turning shaft. In this way, it is possible to smoothly turn the valve main body about the turning shaft serving as the base point, and thus it is possible to enhance the degree of the drainage.

(3) In the opening/closing device of the fuel tank according to the embodiment described above, the drainage port formation member may include a seating portion which receives the valve main body by an opening upper end surface of the drainage port so as to prevent the turning shaft from making contact with an inner wall surface of the recess wall. In this way, it is possible to more smoothly turn the valve main body about the turning shaft serving as the base point, and thus it is possible to more enhance the degree of the drainage.

The present disclosure may be realized in various aspects. For example, the present disclosure may be realized in an embodiment of a fuel tank which includes an opening/closing device of the fuel tank, in an embodiment of a filler neck which includes an opening/closing device of a fuel tank and in an embodiment of a method of manufacturing an opening/closing device of a fuel tank.

The present disclosure is not limited to the embodiments, the examples and the variations described above, and may be realized with various configurations without departing from the spirit thereof. For example, the technical features of embodiments, examples and variations corresponding to the technical features in the individual embodiments may be replaced and combined as necessary in order to solve part or whole of the problems described previously or in order to achieve part or whole of the effects described previously. When the technical features are not described as essential features in the present specification, they may be deleted as necessary.

What is claimed is:

1. An opening/closing device (20) of a fuel tank, the opening/closing device (20) comprising:
   a housing (22) that includes: a passage circumferential wall (22*a*) which surrounds a nozzle insertion passage (100N) for a refueling nozzle (FN); and a first opening (41) which is formed in the passage circumferential wall (22*a*) and through which the nozzle insertion passage (100N) is open to an atmosphere;
   a cover main body (21) in which the housing (22) is incorporated and which includes: a circumferential wall (21*a*) that surrounds the housing (22); a second opening (42) that is formed in the circumferential wall (21*a*), that is opposite the first opening (41) and that is open to the atmosphere; and a nozzle insertion port (104) for the refueling nozzle (FN) that is formed in a ceiling wall (21*b*) of the circumferential wall (21*a*);
   an insertion port opening/closing mechanism (10) which opens and closes the nozzle insertion port (104); and a drainage mechanism (40) which is fitted to the housing (22) so as to be continuous with the first opening (41) and which is located between the cover main body (21) and the housing (22), wherein the drainage mechanism (40) includes:

a drainage port formation member (46) which includes a drainage port (46a) for a liquid that flows from the nozzle insertion passage (100N) toward the first opening (41) and which is fitted to the first opening (41) such that the liquid reaches the drainage port (46a); and a holding member (48) which is fitted to the housing (22) so as to hold a state where the drainage port formation member (46) is fitted to the first opening (41) and which holds a drainage valve (47) for opening and closing the drainage port (46a) to the drainage port formation member (46) and the holding member (48) includes:

a third opening (43) which is continuous with the second opening (42), a drainage passage (48d) which is formed between the third opening (43) and the drainage port (46a); and an engaged portion (48a) which engages with an engagement portion (22d) that is provided on the passage circumferential wall (22a) around the first opening (41) in the housing (22).

2. The opening/closing device (20) of the fuel tank according to claim 1, wherein the drainage port formation member (46) includes a locating portion (46b) which determines a posture of the holding member (48) when the engaged portion (48a) of the holding member (48) engages with the engagement portion (22d) of the housing (22).

3. The opening/closing device (20) of the fuel tank according to claim 2, wherein the housing (22) includes, as the engagement portion, an engagement protrusion (46b), and the holding member (48) includes, as the engaged portion, an engagement arm (48a) which engages with the engagement protrusion (46b).

4. The opening/closing device (20) of the fuel tank according to claim 3, the opening/closing device (20) further comprising:

a fuel passage formation portion (25) which forms a fuel passage (100P) that guides a liquid fuel supplied from the refueling nozzle (FN) to the fuel tank (FT); and a tank-side opening/closing mechanism (30) which opens and closes the fuel passage (100P), wherein the fuel passage formation portion (25) is provided such that the fuel passage (100P) is continuous with the nozzle insertion passage (100N) of the housing (22), the tank-side opening/closing mechanism (30) is provided in part in which the fuel passage (100P) is continuous with the nozzle insertion passage (100N) and at least one of the cover main body (21) and the insertion port opening/closing mechanism (10) includes a communication port (21c, 11a) which makes the nozzle insertion passage (100N) communicate with the atmosphere in a circumferential wall of the nozzle insertion port (104).

5. The opening/closing device (20) of the fuel tank according to claim 1, wherein the housing (22) includes, as the engagement portion, an engagement protrusion (46b), and the holding member (48) includes, as the engaged portion, an engagement arm (48a) which engages with the engagement protrusion (46b).

6. The opening/closing device (20) of the fuel tank according to claim 5, the opening/closing device (20) further comprising:

a fuel passage formation portion (25) which forms a fuel passage (100P) that guides a liquid fuel supplied from the refueling nozzle (FN) to the fuel tank (FT); and a tank-side opening/closing mechanism (30) which opens and closes the fuel passage (100P), wherein the fuel passage formation portion (25) is provided such that the fuel passage (100P) is continuous with the nozzle insertion passage (100N) of the housing (22), the tank-side opening/closing mechanism (30) is provided in part in which the fuel passage (100P) is continuous with the nozzle insertion passage (100N) and at least one of the cover main body (21) and the insertion port opening/closing mechanism (10) includes a communication port (21c, 11a) which makes the nozzle insertion passage (100N) communicate with the atmosphere in a circumferential wall of the nozzle insertion port (104).

7. The opening/closing device (20) of the fuel tank according to claim 1, the opening/closing device (20) further comprising:

a fuel passage formation portion (25) which forms a fuel passage (100P) that guides a liquid fuel supplied from the refueling nozzle (FN) to the fuel tank (FT); and a tank-side opening/closing mechanism (30) which opens and closes the fuel passage (100P), wherein the fuel passage formation portion (25) is provided such that the fuel passage (100P) is continuous with the nozzle insertion passage (100N) of the housing (22), the tank-side opening/closing mechanism (30) is provided in part in which the fuel passage (100P) is continuous with the nozzle insertion passage (100N) and at least one of the cover main body (21) and the insertion port opening/closing mechanism (10) includes a communication port (21c, 11a) which makes the nozzle insertion passage (100N) communicate with the atmosphere in a circumferential wall of the nozzle insertion port (104).

8. An opening/closing device (20) of a fuel tank, the opening/closing device (20) comprising:

a housing (22) that includes: a passage circumferential wall (22a) which surrounds a nozzle insertion passage (100N) for a refueling nozzle (FN); and a first opening (41) which is formed in the passage circumferential wall (22a) and through which the nozzle insertion passage (100N) is open to an atmosphere;

a cover main body (21) in which the housing (22) is incorporated and which includes: a circumferential wall (21a) that surrounds the housing (22); a second opening (42) that is formed in the circumferential wall (21a), that is opposite the first opening (41) and that is open to the atmosphere; and a nozzle insertion port (104) for the refueling nozzle (FN) that is formed in a ceiling wall (21b) of the circumferential wall (21a);

an insertion port opening/closing mechanism (10) which opens and closes the nozzle insertion port (104); and a drainage mechanism (40) which is fitted to the housing (22) so as to be continuous with the first opening (41) and which is located between the cover main body (21) and the housing (22), wherein the drainage mechanism (40) includes:
a drainage passage (48d) which is extended from the first opening (41) to the second opening (42) and which is provided with a drainage port (46a) so as to make the drainage port (46a) for a liquid flowing from the nozzle insertion passage (100N) toward the first opening (41) continuous with the first opening (41); and
a drainage valve (47) which includes a turning shaft (47a) and a valve main body (47c) and which opens and closes the drainage port (46a) by turning of the valve main body (47c) about the turning shaft (47a),
the turning shaft (47a) is arranged in the drainage passage (48d) so as to be located on a side of a center axis (OL) of the nozzle insertion passage (100N) with respect to the valve main body (47c),
a length of the valve main body (47c) in a direction parallel to the turning shaft (47a) is longer than a length thereof in a direction perpendicular to the turning shaft (47a) in front view and
the drainage port (46a) is an opening which has such a shape that the opening is able to be opened and closed with the valve main body (47c).

9. The opening/closing device (20) of the fuel tank according to claim 8,
wherein the turning shaft (47a) includes a flat portion (47b) on the side of the center axis (OL) with respect to a center of the turning shaft (47a).

10. The opening/closing device (20) of the fuel tank according to claim 9,
wherein the length of the valve main body (47c) in the direction parallel is 1.1 to 1.5 times the length thereof in the direction perpendicular,
the housing (22) includes a liquid guide portion (22c) which guides the liquid from the nozzle insertion passage (100N) toward the first opening (41) and
the liquid guide portion (22c) is inclined in a state where the opening/closing device (20) is fitted to a refueling chamber (FR) of a vehicle such that one of both ends of the liquid guide portion (22c) on a side of the first opening (41) is located lower vertically than the end on a side of the nozzle insertion passage (100N).

11. The opening/closing device (20) of the fuel tank according to claim 10,
wherein the cover main body (21) holds, from an outside, the drainage mechanism (40) with respect to the housing (22).

12. The opening/closing device (20) of the fuel tank according to claim 8,
wherein the length of the valve main body (47c) in the direction parallel is 1.1 to 1.5 times the length thereof in the direction perpendicular,
the housing (22) includes a liquid guide portion (22c) which guides the liquid from the nozzle insertion passage (100N) toward the first opening (41) and
the liquid guide portion (22c) is inclined in a state where the opening/closing device (20) is fitted to a refueling chamber (FR) of a vehicle such that one of both ends of the liquid guide portion (22c) on a side of the first opening (41) is located lower vertically than the end on a side of the nozzle insertion passage (100N).

13. The opening/closing device (20) of the fuel tank according to claim 12,
wherein the cover main body (21) holds, from an outside, the drainage mechanism (40) with respect to the housing (22).

14. The opening/closing device (20) of the fuel tank according to claim 8,
wherein the cover main body (21) holds, from an outside, the drainage mechanism (40) with respect to the housing (22).

15. An opening/closing device (20) of a fuel tank, the opening/closing device (20) comprising:
a housing (22) that includes: a passage circumferential wall (22a) which surrounds a nozzle insertion passage (100N) for a refueling nozzle (FN); and a first opening (41) which is formed in the passage circumferential wall (22a) and through which the nozzle insertion passage (100N) is open to an atmosphere;
a cover main body (21) in which the housing (22) is incorporated and which includes: a circumferential wall (21a) that surrounds the housing (22); a second opening (42) that is formed in the circumferential wall (21a), that is opposite the first opening (41) and that is open to the atmosphere; and a nozzle insertion port (104) for the refueling nozzle (FN) that is formed in a ceiling wall (21b) of the circumferential wall (21a);
an insertion port opening/closing mechanism (10) which opens and closes the nozzle insertion port (104); and
a drainage mechanism (40) which is located between the cover main body (21) and the housing (22) so as to drain a liquid from the nozzle insertion passage (100N),
wherein the drainage mechanism (40) includes:
a drainage port formation member (46) which includes a recess wall (46c) that is fitted to the first opening (41), that is protruded from the first opening (41) toward a center axis (OL) of the nozzle insertion port (104) and that forms a recess (48d) recessed on a side of the first opening (41) so as to make the recess (48d) continuous with the second opening (42) and in which in the recess wall (46c), a drainage port (46a) for the liquid flowing from the nozzle insertion passage (100N) toward the first opening (41) is formed;
a drainage valve (47) which includes a turning shaft (47a) and a valve main body (47c) and which opens and closes the drainage port (46a) by turning of the valve main body (47c) about the turning shaft (47a) serving as a base point; and
a holding member (48) which includes a holding piece (48c) that holds the turning shaft (47a) with respect to the recess wall (46c).

16. The opening/closing device (20) of the fuel tank according to claim 15,
wherein the holding piece (48c) holds the turning shaft (47a) with a curved surface part (48e) that faces a surface of the turning shaft (47a).

17. The opening/closing device (20) of the fuel tank according to claim 16,
wherein the drainage port formation member (46) includes a seating portion (46d) which receives the valve main body (47c) by an opening upper end surface of the drainage port (46a) so as to prevent the turning shaft (47a) from making contact with an inner wall surface of the recess wall (46c).

18. The opening/closing device (20) of the fuel tank according to claim 15,
wherein the drainage port formation member (46) includes a seating portion (46d) which receives the valve main body (47c) by an opening upper end surface of the drainage port (46a) so as to prevent the turning shaft (47*a*) from making contact with an inner wall surface of the recess wall (46*c*).

\* \* \* \* \*